US007962720B2

(12) United States Patent (10) Patent No.: US 7,962,720 B2
Shinozaki et al. (45) Date of Patent: Jun. 14, 2011

(54) DISTRIBUTED PROCESSING SYSTEM, DISTRIBUTED PROCESSING METHOD AND COMPUTER PROGRAM

(75) Inventors: Arata Shinozaki, Tokyo (JP); Mitsunori Kubo, Hachioji (JP)

(73) Assignee: Olympus Corporation, Tokyo (JP)

( * ) Notice: Subject to any disclaimer, the term of this patent is extended or adjusted under 35 U.S.C. 154(b) by 796 days.

(21) Appl. No.: 11/922,112

(22) PCT Filed: Jun. 1, 2006

(86) PCT No.: PCT/JP2006/311471
§ 371 (c)(1),
(2), (4) Date: Dec. 13, 2007

(87) PCT Pub. No.: WO2006/134816
PCT Pub. Date: Dec. 21, 2006

(65) Prior Publication Data
US 2010/0100705 A1    Apr. 22, 2010

(30) Foreign Application Priority Data
Jun. 13, 2005    (JP) ................................ 2005-172783

(51) Int. Cl.
*G06F 13/00* (2006.01)
*G06F 15/16* (2006.01)
*G06F 15/163* (2006.01)
(52) U.S. Cl. ......................................... 712/30; 712/28
(58) Field of Classification Search .................. None
See application file for complete search history.

(56) References Cited

U.S. PATENT DOCUMENTS

| 5,644,749 | A | * | 7/1997 | Obayashi | 711/220 |
|---|---|---|---|---|---|
| 6,366,985 | B1 | * | 4/2002 | Beyerlein et al. | 711/147 |
| 6,381,686 | B1 | * | 4/2002 | Imamura | 711/203 |
| 7,032,099 | B1 | * | 4/2006 | Imamura | 712/29 |
| 7,251,675 | B1 | | 7/2007 | Kamakura et al. | |
| 7,386,636 | B2 | * | 6/2008 | Day et al. | 710/5 |
| 2002/0169938 | A1 | * | 11/2002 | Scott et al. | 711/207 |
| 2003/0220118 | A1 | | 11/2003 | Chhabra | |
| 2004/0078718 | A1 | * | 4/2004 | Sato et al. | 714/43 |

(Continued)

FOREIGN PATENT DOCUMENTS
CN    1317111 A    10/2001
(Continued)

OTHER PUBLICATIONS

Gropp, W. etal., Using MPI-2 Advanced Features of the Message-Passing Interface, 1999, MIT Press, pp. 6, and 29-31,133-155, 181-184.*

(Continued)

*Primary Examiner* — Eric Coleman
(74) *Attorney, Agent, or Firm* — Holtz, Holtz, Goodman & Chick, PC

(57) ABSTRACT

A distributed processing system includes at least two processing elements (100 and 200) which are mutually connected, and each processing element having at least a processing section, a memory section, and a communication section. A first processing section (102) stores data in a predetermined area of a first memory section (101), or reads data stored in a predetermined area of the first memory section (101). A first communication section (103) of one processing element (100) transmits data read from the first memory section (101) to the other processing element (200), or stores data received from the other processing element (200) to the first memory section (101).

18 Claims, 20 Drawing Sheets

U.S. PATENT DOCUMENTS

| | | | |
|---|---|---|---|
| 2004/0260746 A1* | 12/2004 | Brown et al. | 709/200 |
| 2005/0021914 A1* | 1/2005 | Chung | 711/145 |
| 2005/0081213 A1* | 4/2005 | Suzuoki et al. | 718/107 |

FOREIGN PATENT DOCUMENTS

| | | |
|---|---|---|
| CN | 1585343 A | 2/2005 |
| JP | 4-048368 A | 2/1992 |
| JP | 11-015679 A | 1/1999 |
| JP | 2003-330739 A | 11/2003 |

OTHER PUBLICATIONS

Jiang, Weihang et al., High Performance MPI-2 One-Sided Communication over InfiniBand, 2004, IEEE Intl. Symposium on Cluster Computing and the Grid, pp. 531-538.*

Matsuda, M., et al., The Design and Implementation of an Asynchronous Communication Mechanism of the MPI Communication Model. 2004, IEEE Cluster pp. 13-22.*

William Gropp et al: Jissen MPI 2-message Passing Interface No. Jokyusha Muke Kino:, Using MPI-2: Advaned Feature of the Massage Passing Interface, Kabushika Kaisha Pearson Education, Oct. 3, 2002, pp. 125-140, 169-171.

Motohiko Matsuda et al: "MPI Tsuchin Model ni Tekishita Hi Doki Tsushin Kiko no Sekkei to Jissen", The Design and Implementation of Asynchronous Communication Mechanism for MPI Communication Model, Transactions of Information Processing Society of Japan, vol. 45, No. SIG11(ACS7), 20041015, pp. 14-23, {CSDB}, CS-NG-2005-01050-002.

Stones, Richard et al, "Beginning Linux Programming", pp. 615-623, Wiley Publishing, U.S.A.

Notification Concerning Transmittal of International Preliminary Report on Patentability and Written Opinion, Chapter I of the Patent Cooperation Treaty (in Japanese and in English) dated Jan. 3, 2008 for PCT/JP2006/311471, 11 pages.

Extended European Search Report dated May 19, 2010 (in English) in counterpart European Application No. 06747231.6.

Gluck et al.: "Protocol and Performance Analysis of the MPC Parallel Computer": Parallel and Distributed Processing Symposium: (Apr. 23, 2001): ISBN: 978-0-7695-0990-7.

Tang et al.: "Optimizing Threaded MPI Execution on SMP Clusters": Proceedings of the 15th International Conference on Supercomputing: (Jun. 12, 2001): XP 002578386.

* cited by examiner

FIG. 11

| Bit | Field |
|---|---|
| 31 ... 0 | |
| 0 | TSKENB : TASK ENABLE |
| 1 | TSKCNT : TASK COUNT |
| 2–7 | RESERVATION |
| 8 | STCN1 : TRANSMISSION TASK COUNT |
| 9 | RTCN1 : RECEPTION TASK COUNT |
| 10 | RAKP1 : RECEPTION RESPONSE PENDING |
| 11–15 | RESERVATION |
| 16 | SMF1 : FLAG FOR DSMB1 |
| 17 | SMF2 : FLAG FOR DSMB2 |
| 18–23 | RESERVATION |
| 24 | RMF1 : FLAG FOR DRMB1 |
| 25 | RMF2 : FLAG FOR DRMB2 |
| 26–31 | RESERVATION |

FIG. 12

| WORD | COMMAND |
|---|---|
| 0 | DESTID : DESTINATION ID |
| 1 | SRCID : SOURCE ID |
| 2 | TASKNO : TASK CATEGORY AND TASK CONTENT |
| 3 | DADDRESS : DESTINATION ADDRESS |
| 4 | SADDRESS : SOURCE ADDRESS |
| 5 | PACKET : NO. OF PACKETS |
| 6 | COUNT : NO. OF TIMES FOR WHICH DATA TRANSFER IS REPEATED |
| 7 | EXTCOMMAND : EXTENSION COMMAND |
| 8 – 15 | RESERVATION |

(bit range: 31 – 0)

FIG. 13

| WORD | COMMAND NAME | COMMAND CONTENT | COMMAND DETAILS |
|---|---|---|---|
| 0 | DESTID | DESTINATION ID | ID OF PROCESSING SECTION OF DESTINATION |
| 1 | SRCID | SOURCE ID | ID OF PROCESSING SECTION OF SOURCE |
| 2 | TASKNO | TASK CATEGORY AND CONTENT | DESIGNATION OF VARIOUS TASKS FOR EXAMPLE, WRITE DATA-TRANSMISSION START REQUEST |
| 3 | DADDRESS | DESTINATION ADDRESS | ADDRESS OF LOCAL MEMORY WHICH STORES RECEPTION DATA |
| 4 | SADDRESS | SOURCE ADDRESS | ADDRESS OF LOCAL MEMORY IN WHICH TRANSMISSION DATA IS STORED |
| 5 | PACKET | NO. OF PACKETS | SIZE OF ONE PACKET IS 64 BYTE NO. OF PACKETS = (n Byte−1) / 64 + 1 |
| 6 | COUNT | NUMBER OF TIMES FOR WHICH DATA TRANSFER IS REPEATED | SPECIFIES AS TO AFTER DIVIDING HOW MANY TIMES, TRANSMISSION OR RECEPTION IS TO BE CARRIED OUT |
| 7 | EXTCOMMAND | EXTENSION COMMAND | AREA WHICH CAN BE USED FREELY ACCORDING TO TASK (WHEN NO. OF PACKETS ARE SET, REAL NO. OF BYTES) |
| 8—15 | | RESERVATION | FOR EXTENSION |

FIG. 14

| WORD | COMMAND NAME | COMMAND CONTENT | COMMAND DETAILS |
|---|---|---|---|
| 0 | DESTID | DESTINATION ID | PE7 (PRACTICALLY ID NO. IS ENTERED, FOR EXAMPLE 7) |
| 1 | SRCID | SOURCE ID | PE1 (PRACTICALLY ID NO. IS ENTERED, FOR EXAMPLE 1) |
| 2 | TASKNO | TASK CATEGORY AND CONTENT | DATA-TRANSMISSION START REQUEST (0x00000301) |
| 3 | DADDRESS | DESTINATION ADDRESS | 0x00024800 |
| 4 | SADDRESS | SOURCE ADDRESS | 0x00020800 |
| 5 | PACKET | NO. OF PACKETS | 10 |
| 6 | COUNT | NUMBER OF TIMES FOR WHICH DATA TRANSFER IS REPEATED | 1 |
| 7 | EXTCOMMAND | EXTENSION COMMAND | 640 |
| 8–15 | | RESERVATION | 0xffffffff (UNDEFINED) |

DISTRIBUTED PROCESSING SYSTEM, DISTRIBUTED PROCESSING METHOD AND COMPUTER PROGRAM

CROSS-REFERENCE TO RELATED APPLICATION

The present application is based upon and claims the benefit of priority from the prior Japanese Patent Application No. 2005-172783 filed on Jun. 13, 2005; the entire contents of which are incorporated herein by reference.

This application is a U.S. National Phase Application under 35 USC 371 of International Application PCT/JP2006/311471 filed Jun. 1, 2006.

TECHNICAL FIELD

The present invention relates to a distributed processing system, and particularly to a distributed processing system which carries out a transmission and a reception of data between processing elements which are provided on different substrates, and a distributed processing method, and a computer program thereof.

BACKGROUND ART

Various distributed processing systems in which, a plurality of processors carry forward a processing in coordination, have hitherto been known. Here, as an example of the simplest structure, a structure in which data is transmitted and received between a plurality of processors provided in the same substrate, such as the same mother board has hitherto been proposed (for example, refer to the following Literature 1).

(Literature 1) Pages 615-623 of Second Revised Edition of 'Linux Programming (Beginning Linux Programming)' by Matthew N. and Stones R., (America), published in the year 2003 by Wiley Publishing.

In a structure proposed in the Literature 1, in the same substrate, one memory section is shared. According to this structure, between a plurality of processors in the same substrate, it is possible to carry out transmission and reception of data efficiently, up to certain extent.

In a state in which, a plurality of computer programs is started simultaneously, in other words, in a state in which a plurality of processes are executed, optimizing a timing of running the plurality of processes, and a timing of transmission and reception of data become important. As in the conventional technology, in the same substrate, it is possible to facilitate to certain extent, speeding-up of arithmetic processing of the plurality of processes.

However, due to further speeding up such as a meteorological simulation of a global scale for example, executing a plurality of processes efficiently over different substrates has been sought. At this time, a plurality of processing sections might have the same function, or might have different functions. Moreover, in any of the cases, many times, the plurality of processing sections, due to the transmission or the reception of data, do not exert the processing function sufficiently. Therefore, it has been difficult to facilitate speeding up of execution of the plurality of processes by the plurality of processing sections in the same substrate, and in the different substrates.

The present invention has been made in view of the abovementioned circumstances, and an object of the present invention is to provide a distributed processing system which is capable of executing efficiently the plurality of processes at a high speed, and a distributed processing method and a computer program.

DISCLOSURE OF THE INVENTION

To solve the abovementioned issues and to achieve an object, according to a first aspect of the present invention, there can be provided a distributed processing system including at least two processing elements which are mutually connected, and each processing element having at least a processing section, a memory section, and a communication section, and the processing section stores data in a predetermined area of the memory section, or reads data which is stored in a predetermined area of the memory section.

The communication section of one processing element transmits to the other processing element, the data which is read from the memory section, or stores in the memory section the data received from the other processing element.

Moreover, according to a preferable aspect of the present invention, it is desirable that the communication section includes at least one of a transmitting section and a receiving section, and the receiving section of the one processing element stores directly the data received from the other processing element, in a predetermined area of the memory section of the one processing element, and the transmitting section of the one processing element transmits to the other processing element, the data which is stored in the predetermined area of the memory section of the one processing element.

Moreover, according to a preferable aspect of the present invention, it is desirable that the two or more processing elements are provided on different substrates.

Further, according to a preferable aspect of the present invention, it is desirable that the two or more processing elements are provided on a same substrate.

According to a preferable aspect of the present invention, it is desirable that the same memory section is used combinedly for the memory section of the one processing element and the memory section of the other processing element.

Moreover, according to a preferable aspect of the present invention, it is desirable that the transmitting section assumes an electric power saving state after transmitting the data stored in the memory section, till receiving a reception completion of the data.

Furthermore, according to a preferable aspect of the present invention, it is desirable that an MPI is used for a transmission and a reception of control information and the data, between the two or more processing elements.

According to a second aspect of the present invention, there can be provided a distributed processing method of connecting mutually at least two processing elements, each processing element having at least a processing section, a memory section, and a communication section, including a data storing and reading step at which, the processing section stores data in a predetermined area of the memory section, or reads data which is stored in a predetermined area of the memory section, and a data transmitting and storing step at which, the communication section of the one processing element transmits to the other processing element, the data which is read from the memory section, or stores in the memory section the data received from the other processing section.

Moreover, according to a preferable aspect of the present invention, it is desirable that the communication step further includes a receiving step and a transmitting step, and at the receiving step, the receiving section of the one processing element stores directly the data received from the other processing element, in a predetermined area of the memory section of the one processing element, and at the transmitting step, the transmitting section of the one processing element transmits to the other processing element, the data which is stored in the predetermined area of the memory section of the one processing element.

Furthermore, according to a preferable aspect of the present invention, it is desirable that, at the communication step, at least one of the transmission and the reception of the data is carried out between the two or more processing elements which are provided on different substrates.

According to a preferable aspect of the present invention, it is desirable that, at the communication step, at least one of the transmission and the reception of the data, is carried out between the two or more processing elements which are provided on the same substrate.

Moreover, according to a preferable aspect of the present invention, it is desirable that the same memory section is used combinedly for the memory section of the one processing element and the memory section of the other processing element.

Furthermore, according to a preferable aspect of the present invention, it is desirable that the one processing element includes a first processing section, a first memory section, and a first communication section, and the other processing element includes a second processing section, a second memory section, and a second communication section, and the distributed processing method further includes a first data storing step at which, the first processing section stores the data in a predetermined area of the first memory section, a data transmission step at which, the first transmitting section transmits the data stored in the first memory section, to the other processing element, a second data storing step at which, the data received by the second receiving section of the other processing element is stored directly in a predetermined area of the second memory section, and a data reading step at which, the second processing section reads the data stored in the second memory section.

According to a preferable aspect of the present invention, it is desirable that the distributed processing method further includes a transmission step at which, the first processing section which has stored the data in the first memory section, transmits a data-transmission start request to the second receiving section, a transmission step at which, the second receiving section which has received the data-transmission start request, transits a data-transmission start response to the first transmitting section, a transmission step at which, the first transmitting section which has received the data-transmission start response, transmits the data stored in the first memory section, to the second receiving section, a storing step at which, the second receiving section which has received the data, stores the data received, in the second memory section, a notifying step at which, the second receiving section which has stored the data in the second memory section, notifies the reception of the data, to the second processing section, and a reading step at which, the second processing section which has received the reception notification of the data, reads the data stored in the second memory section.

Moreover, according to a preferable aspect of the present invention, it is desirable that the distributed processing system further includes a transmission step at which, the second processing section which has read the data, transmits a reception completion of the data, to the first transmitting section, and a notifying step at which, the first transmitting section which has received the reception completion of the data, notifies the reception completion of the data to the first processing section.

Furthermore, according to a preferable aspect of the present invention, it is desirable that the first transmitting section is in a state of not having an effect on a processing capacity of the one processor element including the first processing section, after transmitting the data stored in the first memory section, till receiving the reception completion of the data, and the second receiving section is in a state of not having an effect on a processing capacity of the other processing element including the second processing section, after transmitting the data-transmission start response, till receiving the data.

According to a preferable aspect of the present invention, it is desirable that an MPI is used for a transmission and a reception of control information and the data, between the two or more processing elements.

Moreover, according to a third aspect of the present invention, there can be provided a computer program which is for a distributed processing system in which at least two processing elements, each processing element having at least a processing section, a memory section, and a communication section, are mutually connected, and which is readable by a computer, and which causes the computer to perform making the processing section store data in a predetermined area of the memory section, or read data which is stored in a predetermined area of the memory section, making the communication section of the one processing element transmit to the other processing element, the data which is read from the memory section, or store in the memory section the data received from the other processing element.

The distributed processing system according to the present invention includes at least two processing elements which are mutually connected, and each processing element having at least a processing section, a memory section, and a communication section. The processing section stores data in a predetermined area of the memory section, or reads data which is stored in a predetermined area of the memory section. The communication section of one processing element transmits to the other processing element, the data which is read from the memory section, or stores in the memory section the data received from the other processing element. Accordingly, while the communication section is transmitting or receiving data, the processing section is capable of executing a processing other than the data communication. Therefore, there is no interruption of processing, or a reduction in a processing capacity of the processing section due to the communication of data. Accordingly, the processing section is capable of improving an operation rate all the time. As a result, it is possible to provide a distributed processing system which is capable of executing efficiently a plurality of processes at a high speed.

BRIEF DESCRIPTION OF THE DRAWINGS

FIG. 11 is a diagram showing a structure of MAIL_CONTROL of the second embodiment;

FIG. 12 is a diagram showing a structure of a mail-box for command of the second embodiment;

FIG. 13 is a diagram showing details of commands of the second embodiment;

FIG. 14 is a diagram showing an example of use of the mail-box for command of the second embodiment;

BEST MODE FOR CARRYING OUT THE INVENTION

A distributed processing system, a distributed processing method, and a computer program according to the present invention will be described below. However, the present invention is not restricted to embodiments described below.

First Embodiment

Figure 1:
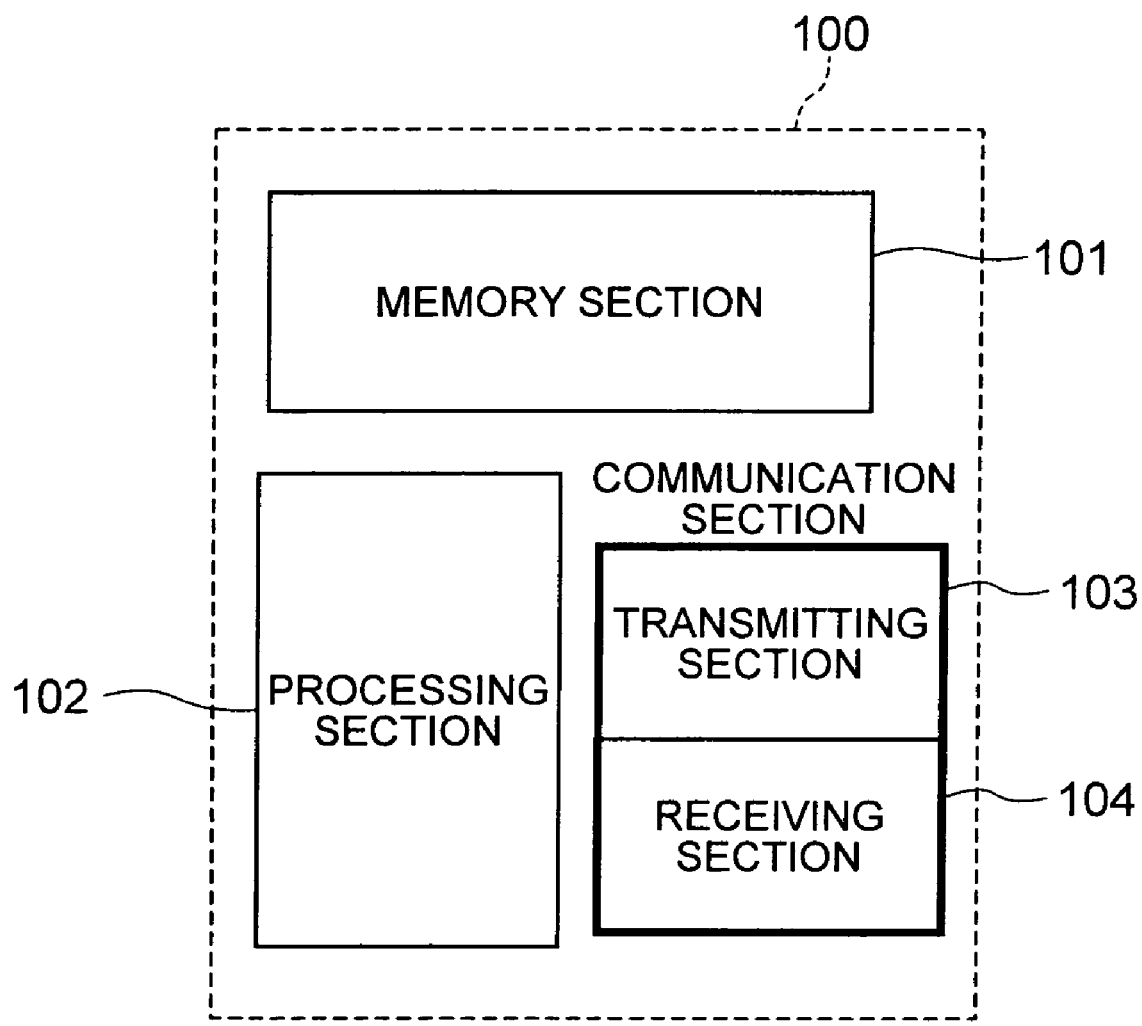
FIG. 1 is a diagram showing a structure of a processing element of a first embodiment of the present invention.

A distributed processing system according to a first embodiment of the present invention will be described below. FIG. 1 shows a schematic structure of a processing element 100. The processing element 100 includes a memory section 101, a processing section 102, a transmitting section 103, and a receiving section 104. The transmitting section 103 and the receiving section 104 combinedly correspond to a communication section.

The processing section 102 carries out a processing of data. The transmitting section 103 transmits data to a processing element of a counterpart to whom data is to be transmitted. The receiving section 104 receives data from a transmitting section of a processing element which has made a request for a data transmission. Moreover, the memory section 101 stores data which is received or transmitted, and information (hereinafter, appropriately called as 'command') which controls the communication.

Figure 2:
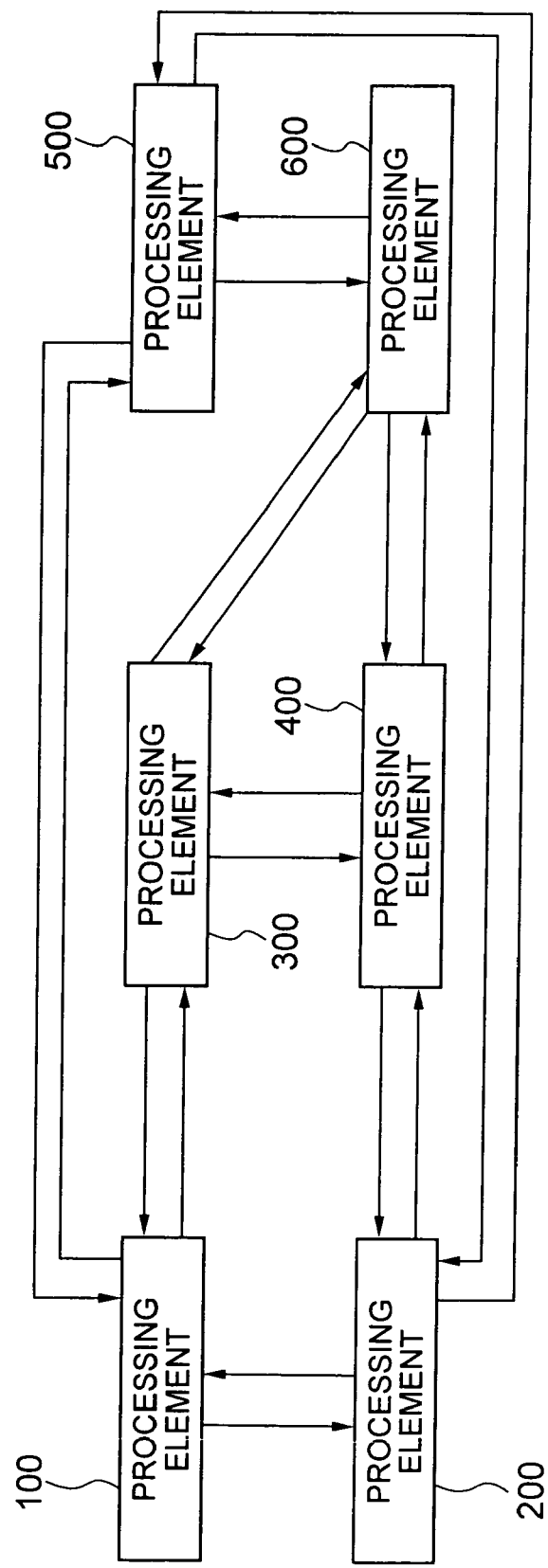
FIG. 2 is a diagram showing an outline of communication between a plurality of processing elements.

FIG. 2 shows a distributed processing system which includes two or more, for example, six processing elements 100, 200, 300, 400, 500, and 600. For example, the processing element 100 is capable of carrying out a transmission and a reception of data to and from each of the other processing element 200, the processing element 300, or the processing element 500.

The processing elements 100, 200, 300, 400, 500, and 600 may be provided on the same substrate, or on different substrates.

Figure 3:
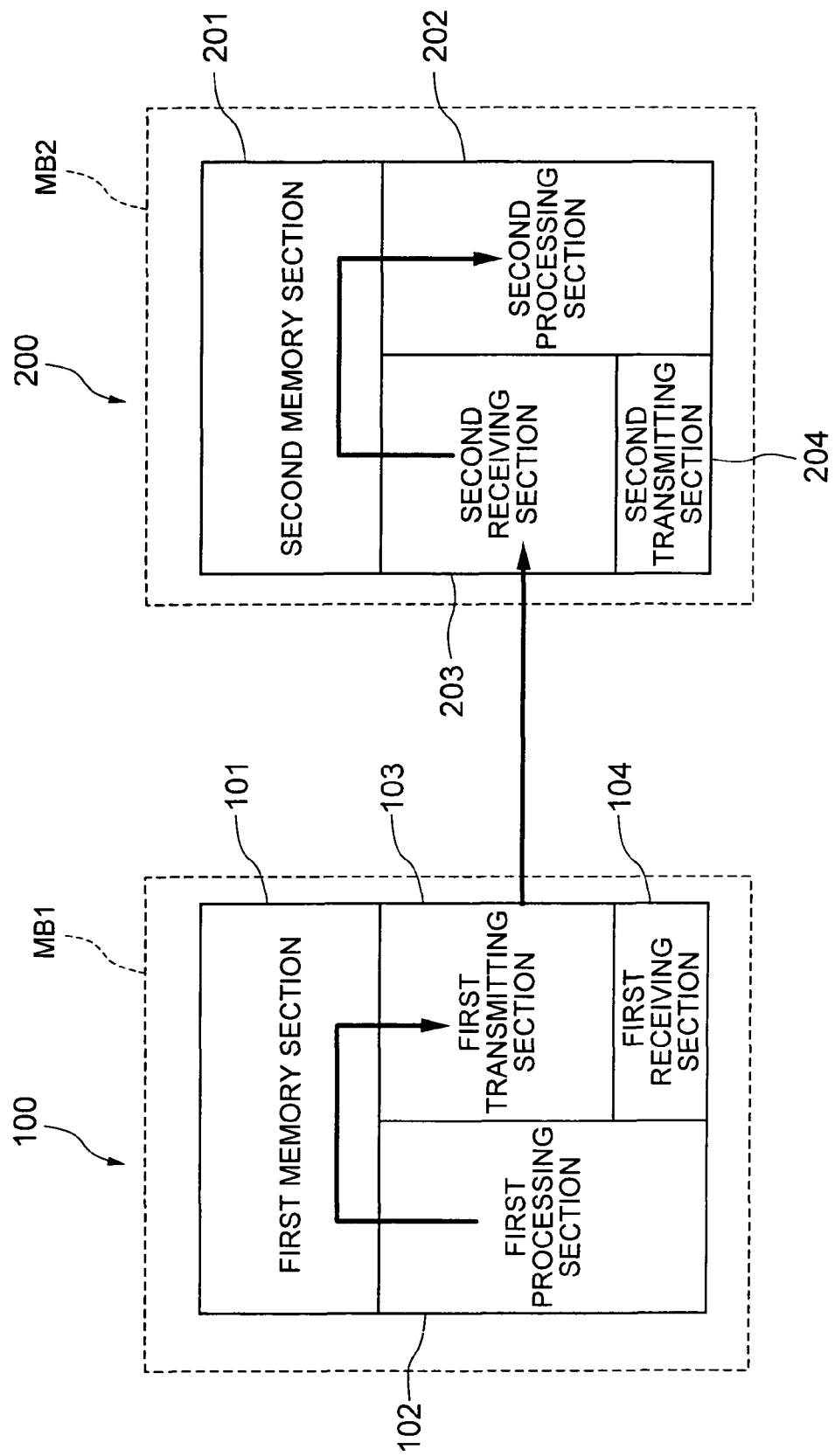
FIG. 3 is a diagram showing an outline of communication between two processing elements.

For ease of understanding, communication of data between the two processing elements 100 and 200 will be taken into consideration. By using FIG. 3, a transmission of data from the processing element 100 to the processing element 200 will be described below. Here, the processing element 100 is provided on a substrate MB 1. Moreover, the processing element 200 is provided on the other substrate MB 2.

The first processing element 100 includes a first memory section 101, a first processing section 102, a first transmitting section 103, and a first receiving section 104. Moreover, the second processing element 200 includes a second memory section 201, a second processing section 202, a second transmitting section 204, and a second receiving section 203.

The first processing section 102 stores data in a predetermined area of the first memory section 101, or reads data stored in a predetermined area of the first memory section 101. The first receiving section 104 of the first processing element 100 stores directly data received from the other processing element 200, in the first memory section 101 of the processing element 100. Furthermore, the first transmitting section 103 of the processing element 100 transmits data stored in the predetermined area of the first memory section of the processing element 100, to the other processing element 200. In such manner, in the processing element 100, a direct communication is not carried out between the first processing section 102 and the first transmitting section 103, or between the first processing section 102 and the first receiving section 104.

At the time of transmitting data from the processing element 100 to the processing element 200, the first receiving section 104 and the second transmitting section 204 are not used. A general processing procedure of each of the first processing section 102, the first transmitting section 103, the second receiving section 203, and the second processing section 202 will be described below by using flowcharts. Moreover, processing procedure in further details will be described later in a second embodiment.

Figure 4:
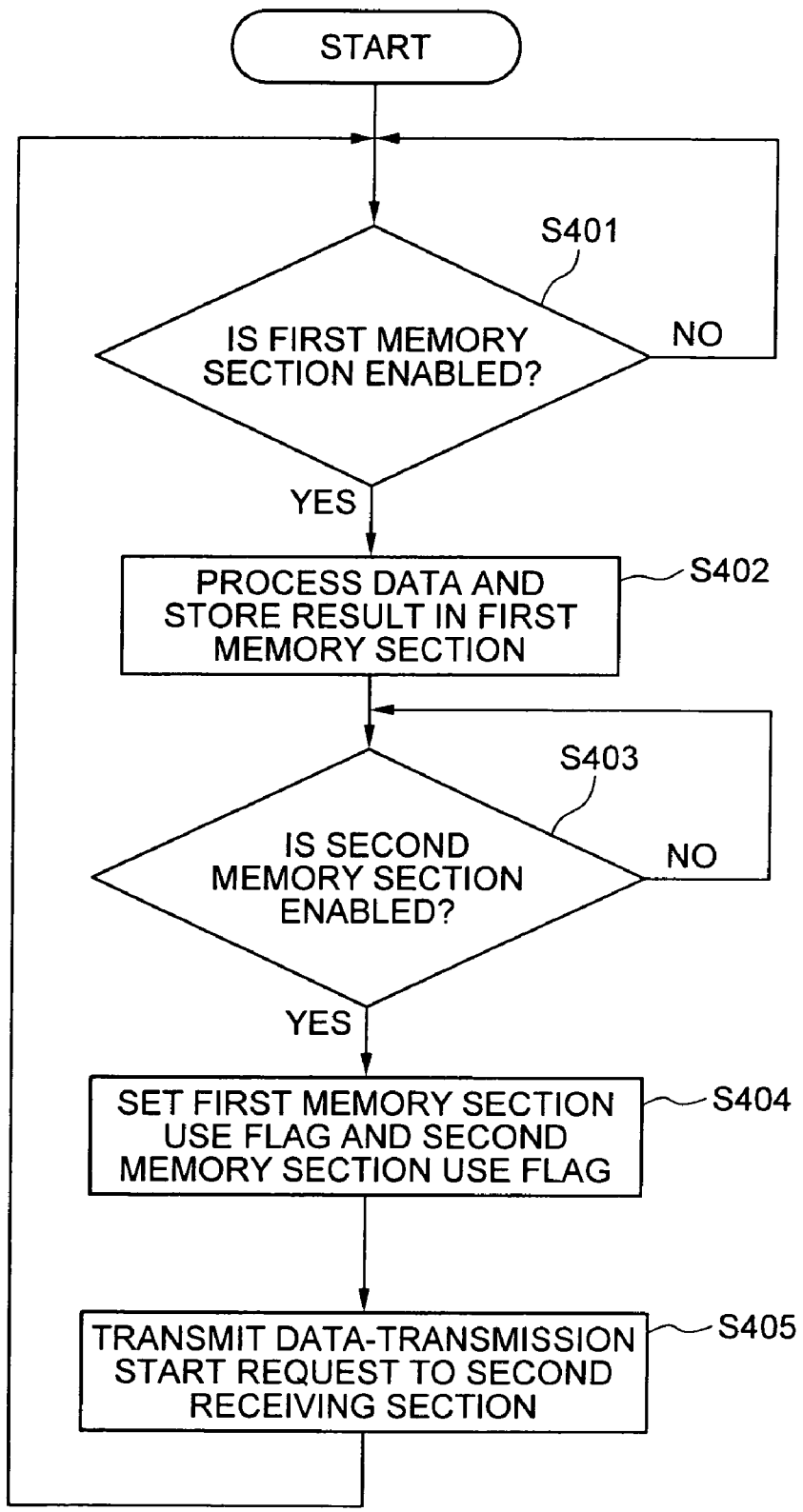
FIG. 4 is a flowchart showing a processing procedure of a first processing section of the first embodiment.

FIG. 4 is a flowchart showing a processing procedure of the first processing section 102. At step S401, a judgment of whether or not the first memory section 101 is enabled, is made. When a judgment result at step 5401 is affirmative (YES), at step S402, the first processing section 102 carries out processing of data, and stores a processing result in a predetermined area of the first memory section 101. When the judgment result is negative (NO), step S401 is repeated.

At step S402, a judgment of whether or not the second memory section 201 is enabled is made. When a judgment result at step S402 is affirmative, the first processing section 102 sets a first memory section use flag and a second memory section use flag. Moreover, when the judgment result is negative, step S403 is repeated. At step S405, the first processing section 102 sends a data-transmission start request to the second receiving section 203. Next, the process returns to step S401 and similar processing procedure is carried out once again.

Figure 5:
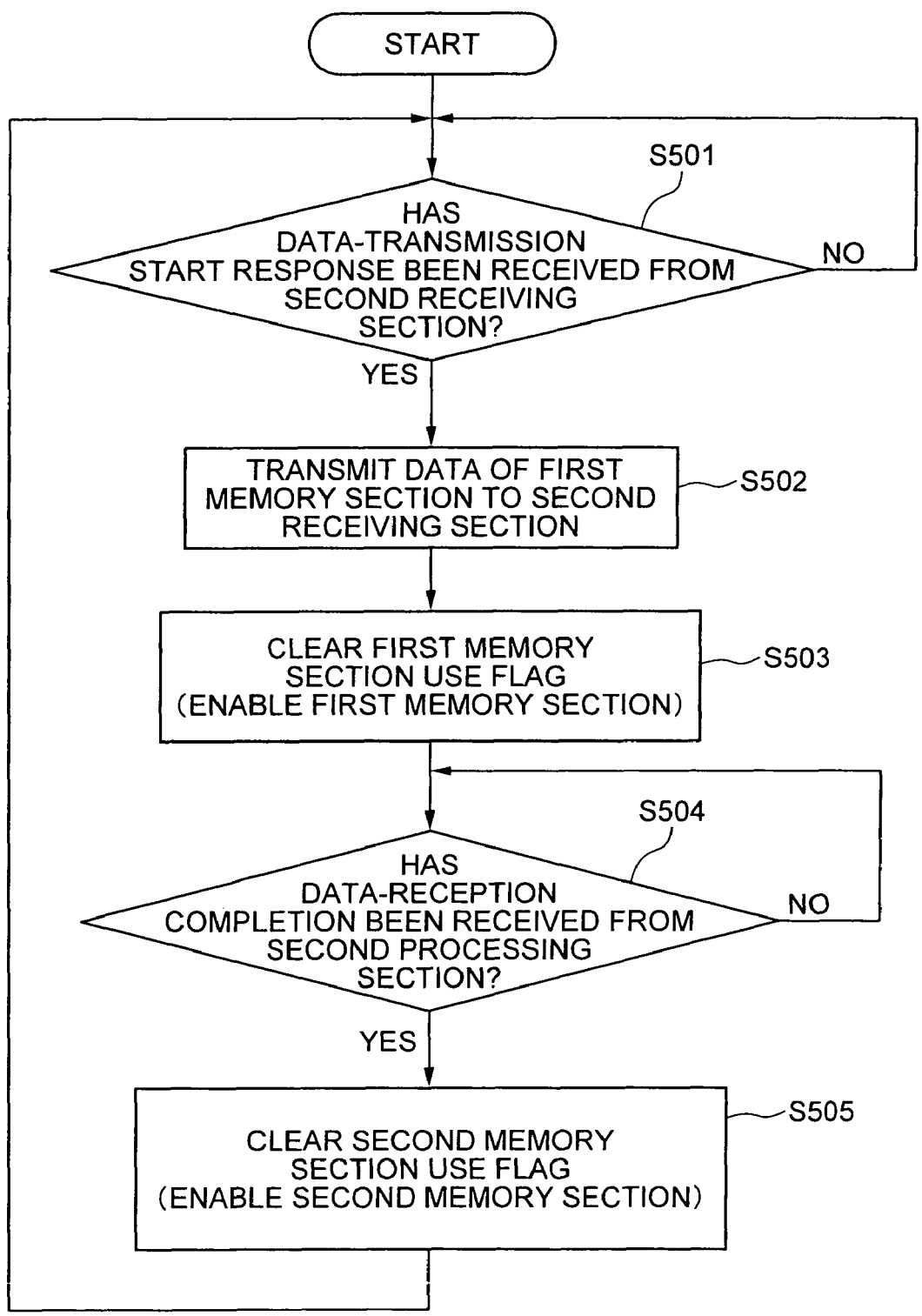
FIG. 5 is a flowchart showing a processing procedure of a first transmitting section of the first embodiment.

FIG. 5 is a flowchart of a processing procedure of the first transmitting section 103. At step S501, a judgment of whether or not a data-transmission start response has been received from the second receiving section 203 is made. When a judgment result at step S501 is affirmative, at step S502, the first transmitting section 103 transmits the data stored in the first memory section 101, to the second receiving section 203. Moreover, when the judgment result is negative, step S501 is repeated.

At step S503, the first memory section use flag is cleared. Accordingly, the first memory section 101 is enabled. At step S504, a judgment of whether or not a data-reception completed is received from the second processing section is made. When a judgment result at step S504 is negative, step S504 is repeated. When the judgment result is affirmative, at step S505, the second memory section use flag is cleared. Accordingly, the second memory section 201 is enabled. Next, the process returns to step S501, and a similar processing procedure is carried out once again.

Figure 6:
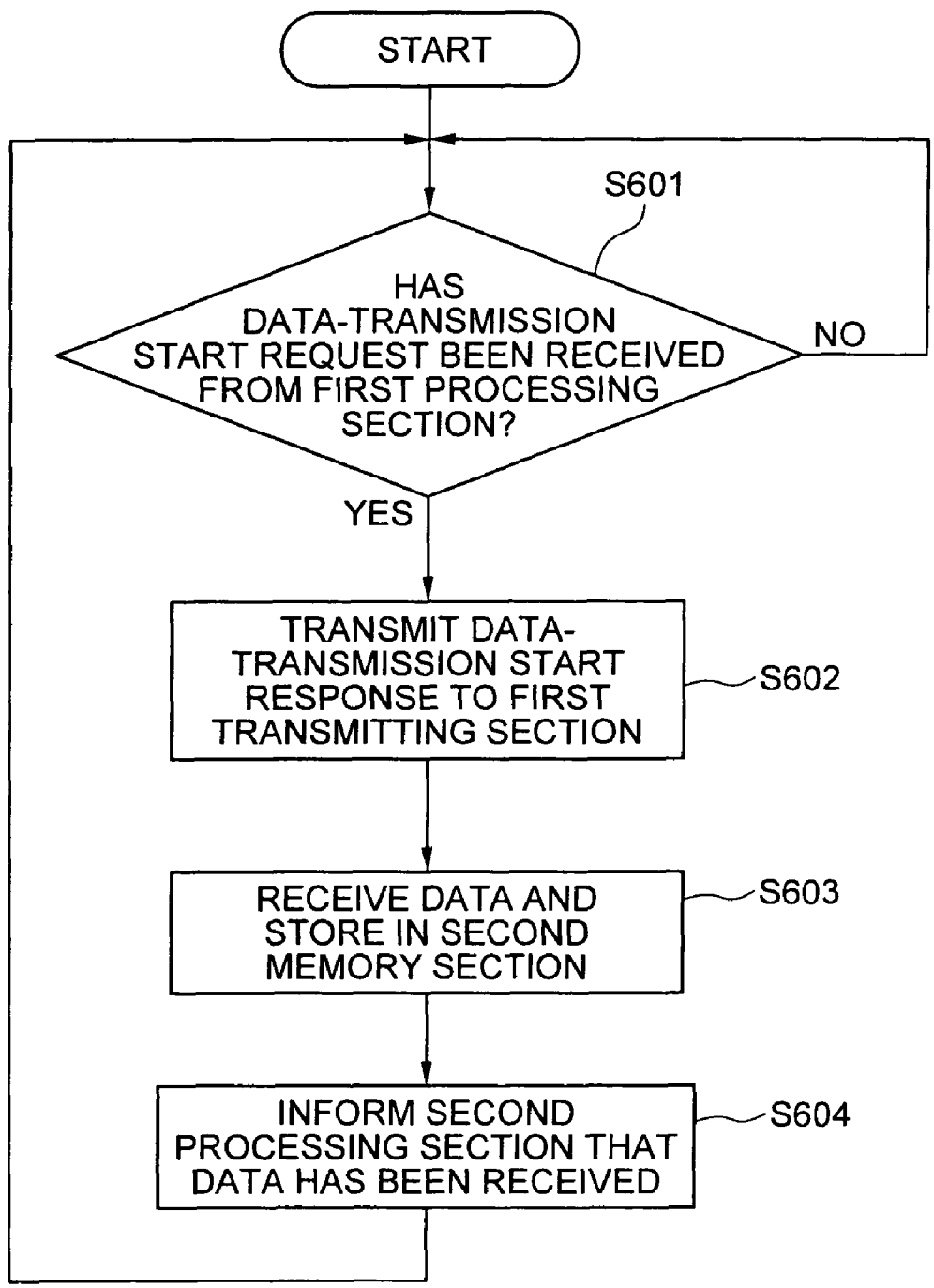
FIG. 6 is a flowchart showing a processing procedure of a second receiving section of the first embodiment.

FIG. 6 is a flowchart showing a processing procedure of the second transmitting section 203. At step S601, a judgment of whether or not a data-transmission start request has been received from the first processing section 102 is made. When a judgment result at step S601 is affirmative, at step S602, the second receiving section 203 transmits a data-transmission start response to the first transmitting section 103. When the judgment result is negative, step 5601 is repeated.

At step S603, the second receiving section 203 receives data. Next, the second receiving section 203 stores the data which is received, in a predetermined area of the second memory section 201. At step S604, it is notified to the second processing section 202 that the data has been received.

Figure 7:
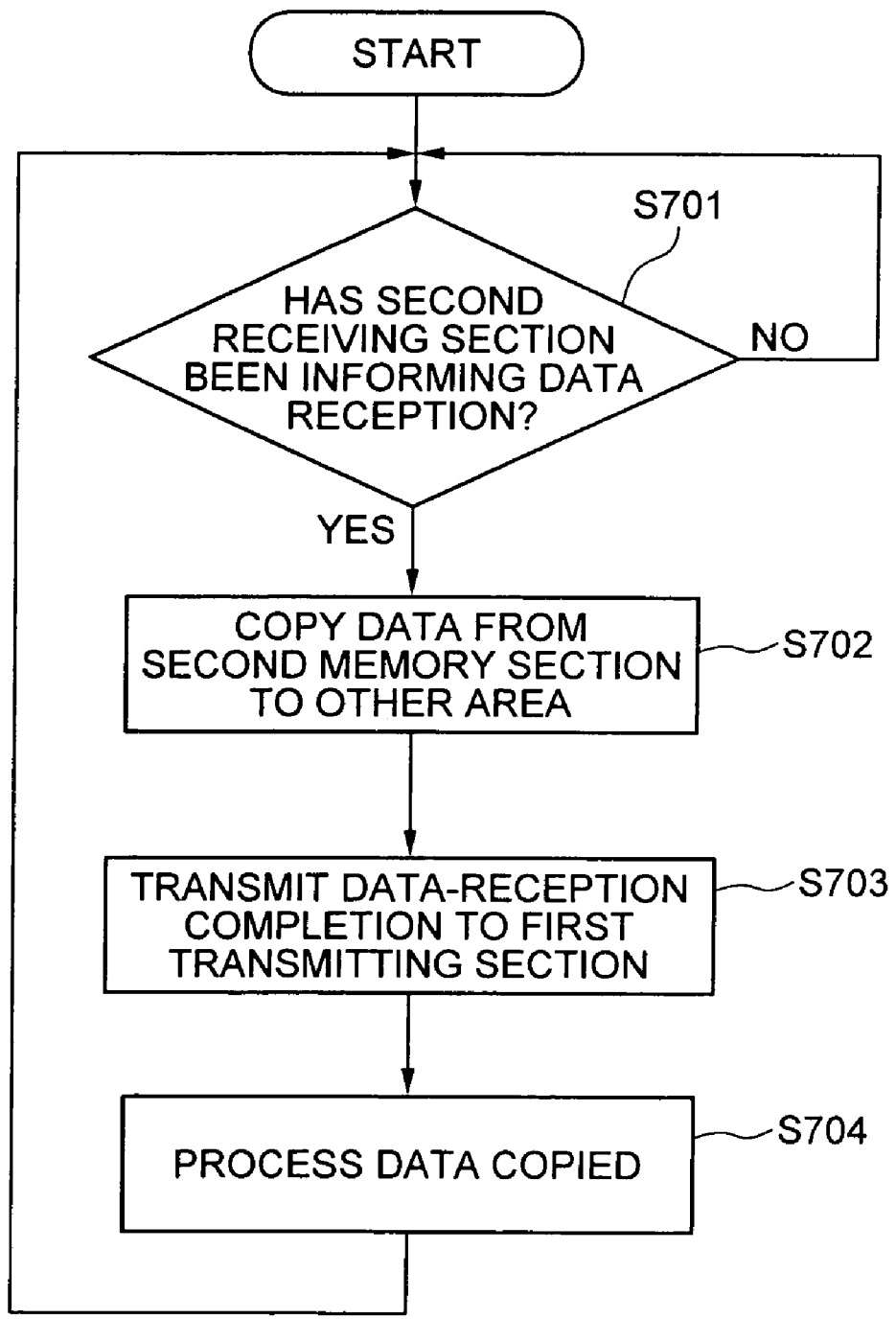
FIG. 7 is a flowchart showing a processing procedure of a second processing section of the first embodiment.

FIG. 7 is a flowchart showing a processing procedure of the second processing section 202. At step S701, a judgment of whether or not the second receiving section 203 has been informing the data reception is made. When a judgment result at step S701 is affirmative, at step S702, the second processing section 202 copies the data stored in the predetermined area of the second memory section 201, to the other area, such as a working memory. When the judgment result is negative, step S701 is repeated.

At step S703, a data-reception completion is transmitted to the first transmitting section 103. At step S704, the second processing section 202 carries out processing of the data which was copied.

FIGS. 8A, 8B, 8C, 8D, 8E, and 8F are timing charts showing the first processing section 102, the first transmitting section 103, the second receiving section 203, the second processing section 202, the first memory section use flag, and the second memory section use flag respectively. In the timing chart, a state in which the processing section, the transmitting section, and the receiving section is executing a processing is indicated as High and a stand-by state is indicated as Low.

Figure 8:
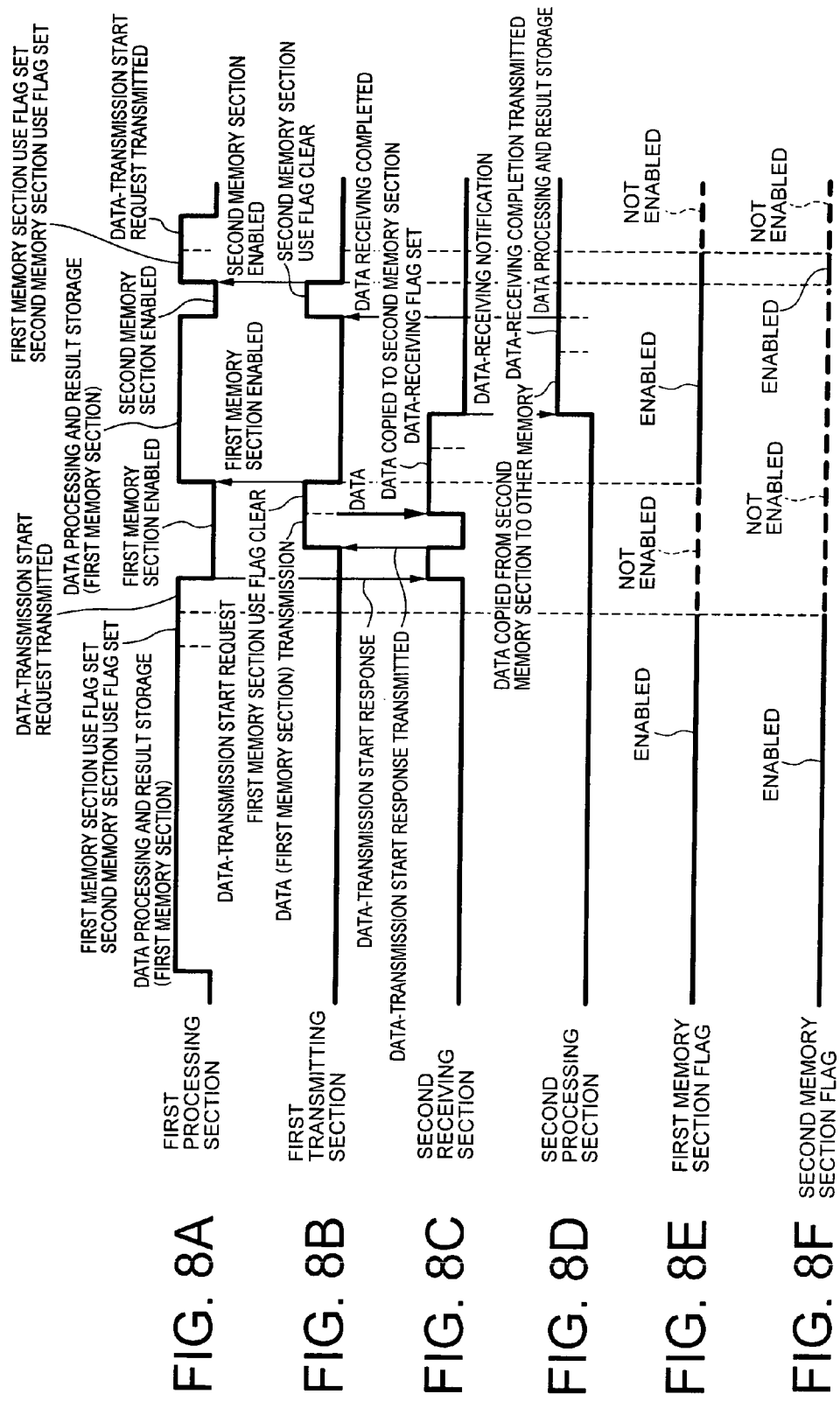
FIG. 8A to FIG. 8F are timing charts of a distributed processing system of the first embodiment.

As it is evident from FIG. 8A, except during a time when the first memory section 101 and the second memory section 201 are not enabled, the first processing section 102 assumes a High state, in other words, a state in which it is possible to carry out processing. Therefore, at the time when the processing element 100 transmits data to the processing element 200, it is possible to reduce substantially the interruption in processing which is due to communication. As a result, it is possible to operate the first processing section 102 with a high efficiency.

Moreover, as it is evident from FIG. 8B, the first transmitting section 103 assumes an electric power saving state after transmitting the data stored in the first memory section 101, till receiving the data-reception completion.

Moreover, it is desirable to use a computer program which is for hardware of the distributed processing system, and which is readable by a computer, and which causes the computer to perform making the first processing section 102 store data in the predetermined area of the first memory section 101, or read data which is stored in the predetermined area of the first memory section 101, making the communication section (the second receiving section 203 and the second transmitting section 204 combinedly) of the one processing element 200 transmit to the other processing element 100, the data which is read from the first memory section 101, or store in the first memory section 101 the data received from the other processing element 200.

It is possible to realize functions of the processing section, the transmitting section, and the receiving section by using a CPU etc. The distributed processing system according to the present invention is also capable of realizing by causing the computer to read a computer program from an information storage medium.

Moreover, as an information storage medium, various media which are readable by a computer, such as a flexible disc, a CD-ROM, a magneto-optical disc, an IC card, a ROM cartridge, a printed matter such as a punch card and a bar code in which, codes are printed, and an internal storage device (memory such as a RAM and a ROM) and an external storage device of a computer, can be used. A readout method of a computer program may be a contact method or a non-contact method.

Further, instead of an information storage medium, it is also possible to realize various function described above by downloading the computer program from a host device etc. via a transmission line.

Second Embodiment

Figure 9:
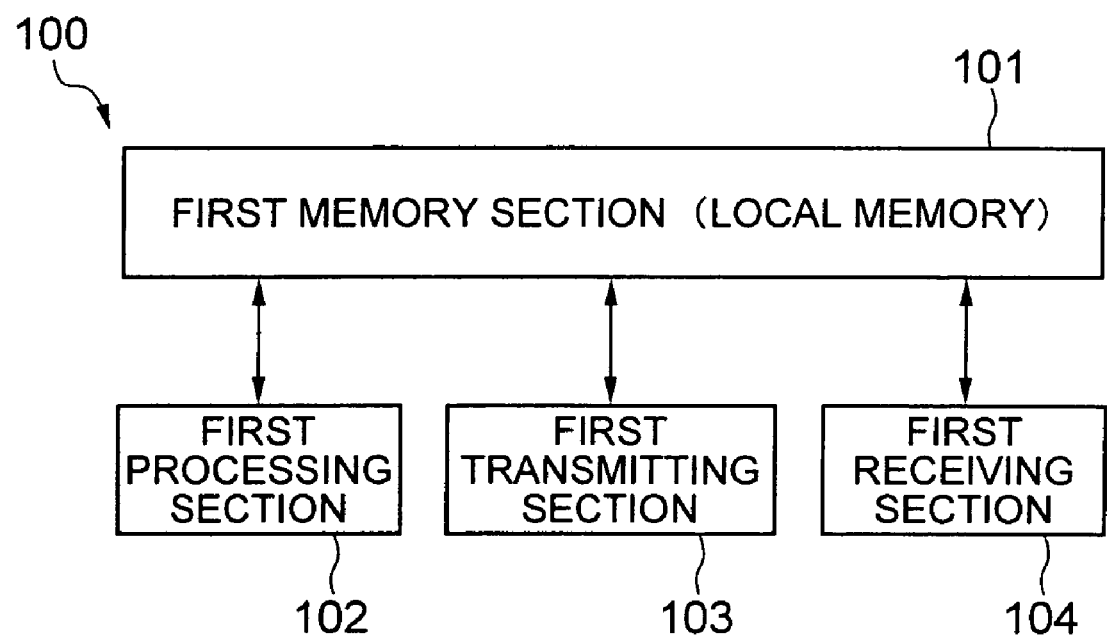
FIG. 9 is a diagram showing a structure of a processing element of a second embodiment of the present invention.

Next, a distributed processing method according to the second embodiment of the present invention will be described below. FIG. 9 shows a structure of a processing element 100 which carries out this distributed processing method. Same reference numerals are assigned to components which are same as in the first embodiment, and the description to be repeated is omitted. Each of the first processing section 102, the first transmitting section 103, and the first receiving section 104 are structured to be able to transmit or receive data and commands.

In the second embodiment, an MPI (Message Passing Interface) is used. The MPI is a message passing function specification which is instituted by an MPI Forum. The MPI has been created for integrating functions and interfaces of a communication function, with an object of a portability of a computer program and a data communication between different machine types.

Moreover, the communication involves mainly a command transfer and a data transfer. A command is control information including a memory address and a data size necessary for a transfer of data and a notification of a request etc., an ID of a source, and ID of a destination, a communication start request, and a communication start response etc. Moreover, the communication of data and commands between the first processing section 102 and the first transmitting section 103, or between the first processing section 102 and the first receiving section 104 is carried out via the first memory section 101. The first memory section 101 is, for example, a local memory having a volume of 256 KB.

Figure 10:
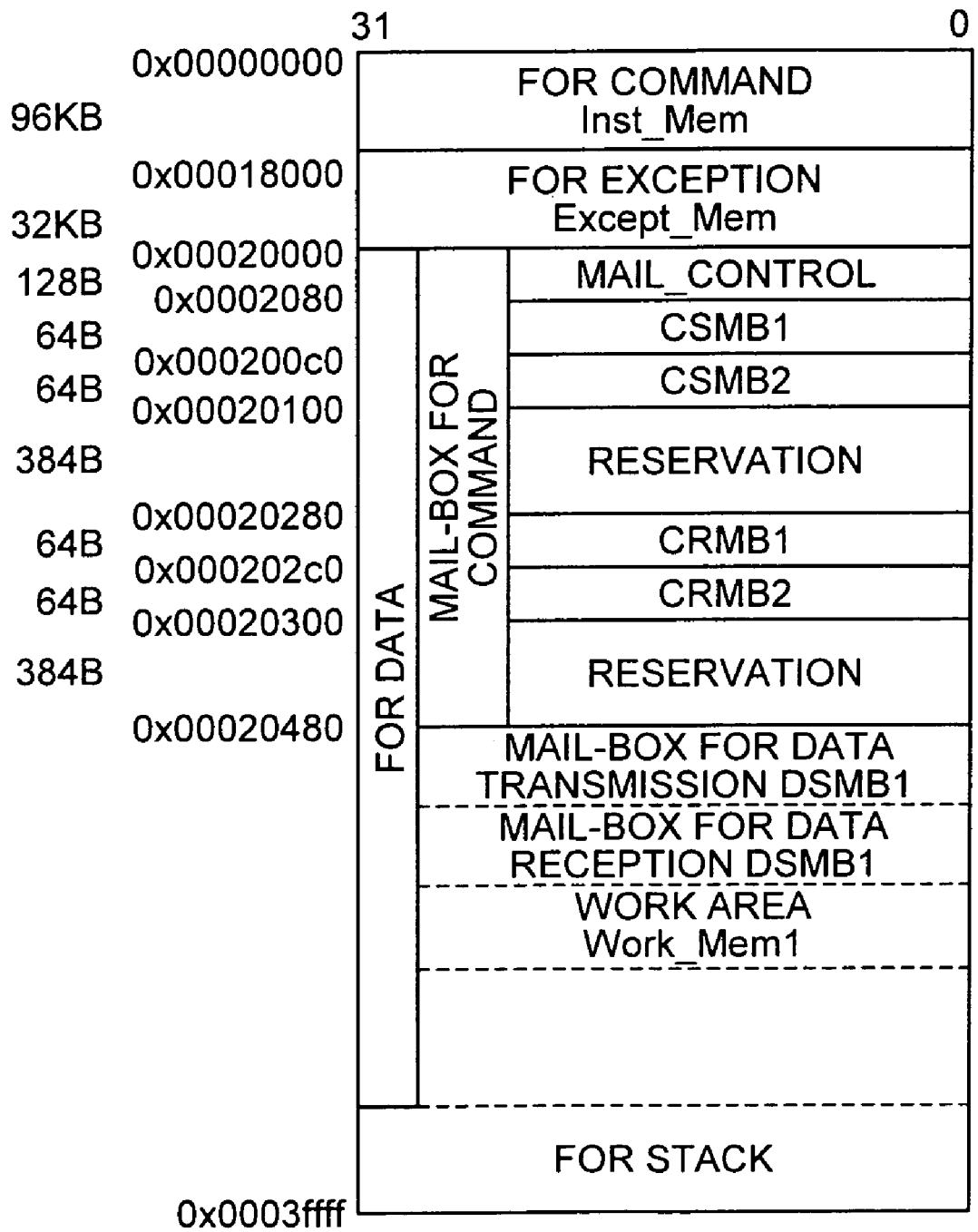
FIG. 10 is a diagram showing a structure of a local memory map of the second embodiment.

Hereinafter, a data structure for transmitting and receiving commands and data upon storing, at the time of communication will be called as a 'mail-box'. The mail-boxes are of four types namely, a mail-box for command transmission (CSMB), a mail-box for command reception (CRMB), a mail-box for data transmission (DSMB), and a mail-box for data reception (DRMB). Moreover, a mail control data structure (MAIL_CONTROL) which controls a communication state of the mail-box is provided. The mail control and the mail-box are mapped in the local memory as shown in FIG. 10.

Moreover, FIG. 11 shows a structure of a mail control data structure (MAIL_CONTROL). The contents will be described below.

8: STCN 1: Transmission Task Count
   (0: state in which no communication is performed,
   1: data communication is being performed)
16: SMF 1: transmission mail-box full. A state flag of the mail box for data transmission
   (0: empty, 1: full)
24: RMF 1: reception mail-box full. A state flag of the mail box for data reception
   (0: empty, 1: full)

A task enable (TSKENB), a task count (TSKCNT), a reception task count (RTCN 1), a reception response pending (RAKP 1), a flag for DSMB 2 (SMF 2), and a flag for DRMB 2 (RMF 2) which are shown by oblique lines in FIG. 11 are not used.

FIG. 12 shows a structure of a mail-box for command. A structure of the mail-box for command reception and a structure of the mail-box for command transmission are common. Moreover, FIG. 13 shows details of a command which is stored in each word of the mail-box structure shown in FIG. 12. The mail-box for data stores only data for transfer. For example, the mail-box for data can have any size in multiples of 64 bytes according to a user.

Next, an example of use of the mail-box for command at the time of satisfying the following communication conditions (1) to (6) is shown in FIG. 14. The processing element will be appropriately abbreviated as 'PE'.

Communication Conditions:
(1) Communication to be from a PE1 (transmission side) to a PE7 (reception side).
(2) Amount of data has to be 10 packets (640 bytes).
(3) Task category and content have to be data-transmission start request.
(4) Data received to be stored in an area of 640 bytes from an address 0x000208 of a local memory of the PE7.
(5) Data to be transmitted to be stored in an area of 640 bytes, from an address 0x000248 of a local memory of the PE1.
(6) Transfer is not repeated (not to be transferred upon dividing, but the entire data is transmitted once).

Figure 15:
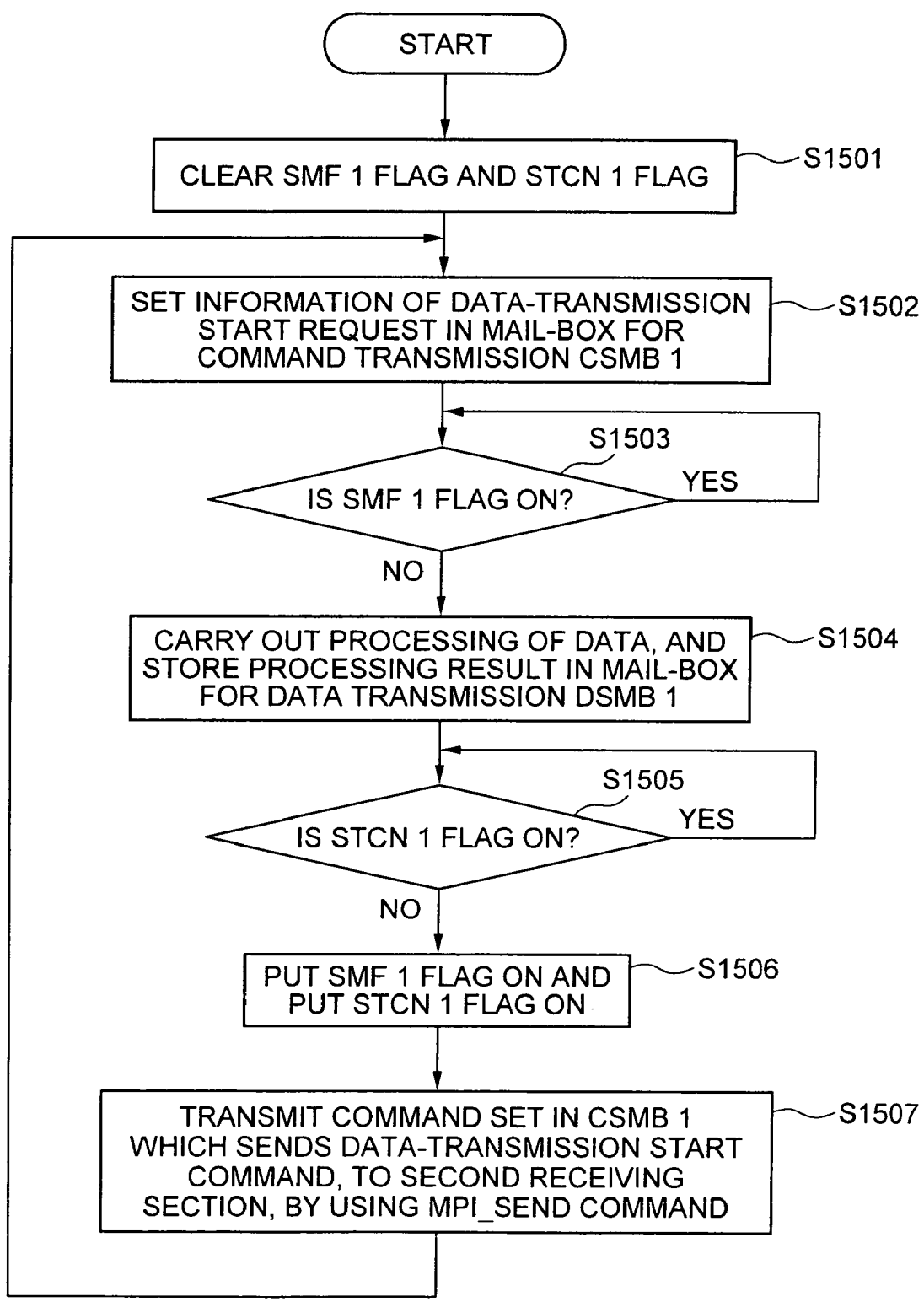
FIG. 15 is a flowchart showing a processing procedure of a first processing section of the second embodiment.

Next, a processing procedure in the second embodiment will be described by referring to FIG. 15, FIG. 16, FIG. 17, and FIG. 18. FIG. 15 is a flowchart showing a processing procedure of the first processing section 102. At step S1501, the SMF 1 flag for the data transmission mail-box and the transmission count STCN 1 flag are cleared. At step S1502, information of a data-transmission start request is set in the mail-box for command transmission CSMB 1.

At step S1503, a judgment of whether or not the SMF 1 flag has been set is made. When a judgment result at step S1503 is affirmative, step S1503 is repeated. When the judgment result is negative, at step S1504, the first processing section 102 performs processing of data, and stores a processing result in the mail-box for data transmission DSMB 1. Step S1504 corresponds to a first data storing step.

At step S1505, a judgment of whether or not the transmission task count STCN 1 flag has been set is made. When a judgment result at step S1505 is affirmative, step S1505 is repeated. When the judgment result is negative, at step S1506, the SMF 1 flag for the data-transmission mail-box and the transmission task count STCN 1 flag are set.

Moreover, at step S1507, the first processing section 102 transmits a data-transmission start request. For this, a command set in the mail-box for command transmission CSMB 1 is transmitted to the second receiving section 203 by using an MPI_SEND command.

Figure 16:
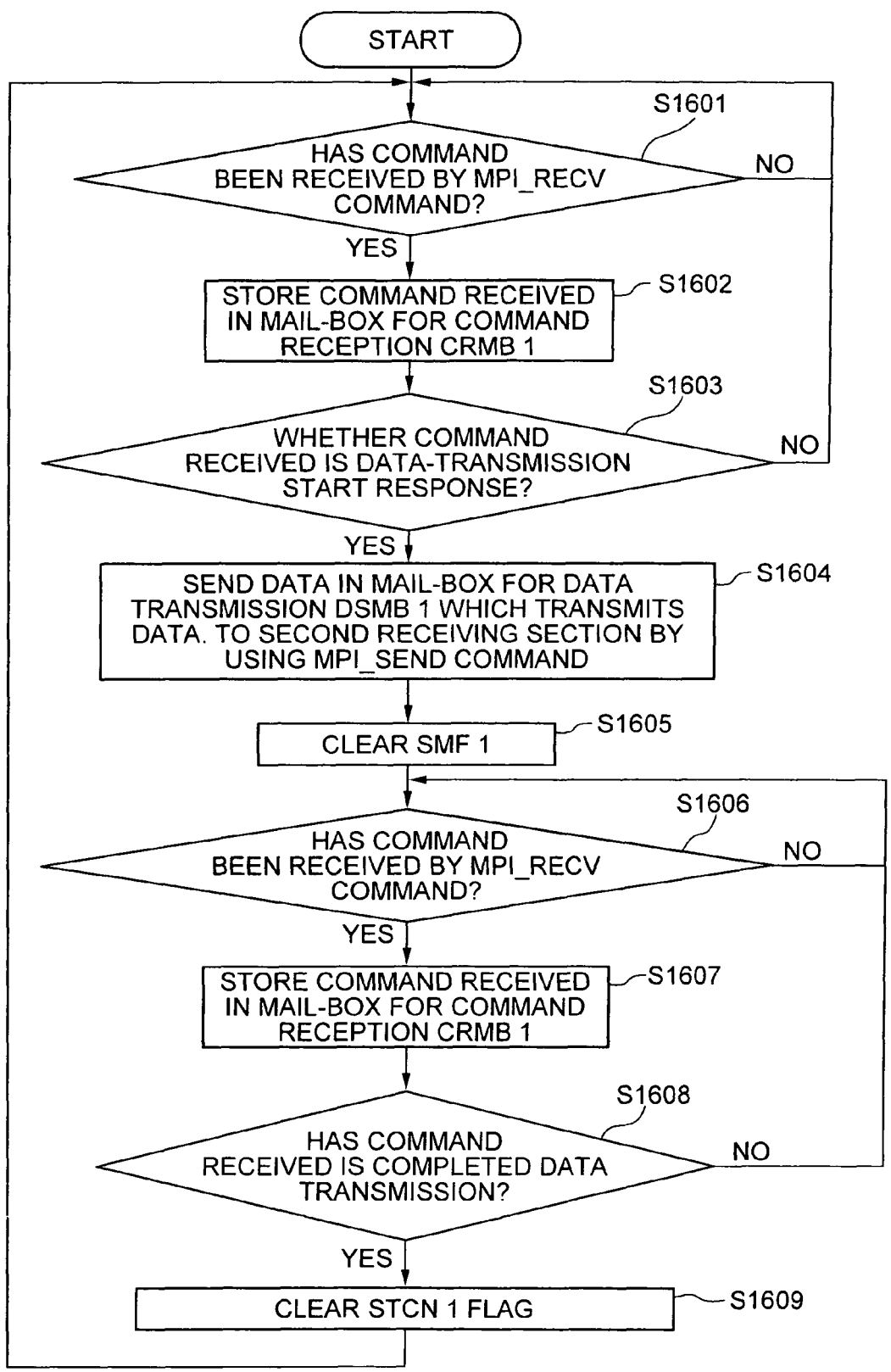
FIG. 16 is a flowchart showing a processing procedure of a first transmitting section of the second embodiment.

FIG. 16 is a flowchart showing a processing procedure of the first transmitting section 103. At step S1601, a judgment of whether or not the command is received by an MPI_RECV command is made. When a judgment result at step S1601 is negative, step S1601 is repeated. When the judgment result is affirmative, at step S1602, the command which is received is stored in the mail-box for command reception CRMB 1.

At step S1603, a judgment of whether or not the command received is a data-transmission start response is made. When a judgment result at step S1603 is negative, the process returns to step S1601. When the judgment result is affirmative, at step S1604, the first transmitting section 103 transmits data. Step S1604 corresponds to a data transmission step. For this, data stored in the mail-box for data transmission DSMB 1 is sent to the second receiving section 203 by using the MPI_SEND command.

At step S1605, the SMF 1 flag of the mail-box for data transmission is cleared. At step S1606, a judgment of whether or not the command is received by the MPI_RECV command is made. When a judgment result at step S1606 is negative, step S1606 is repeated. When the judgment result is affirmative, at step S1607, the command which is received is stored in the mail-box for command reception CRMB 1.

At step S1608, a judgment of whether or not the command received is a data-reception completion is made. When a judgment result at step S1608 is negative, the process returns to step S1606. When the judgment result is affirmative, at step S1609, the transmission task count STCN 1 flag is cleared. Next, the process returns to step S1601.

Figure 17:
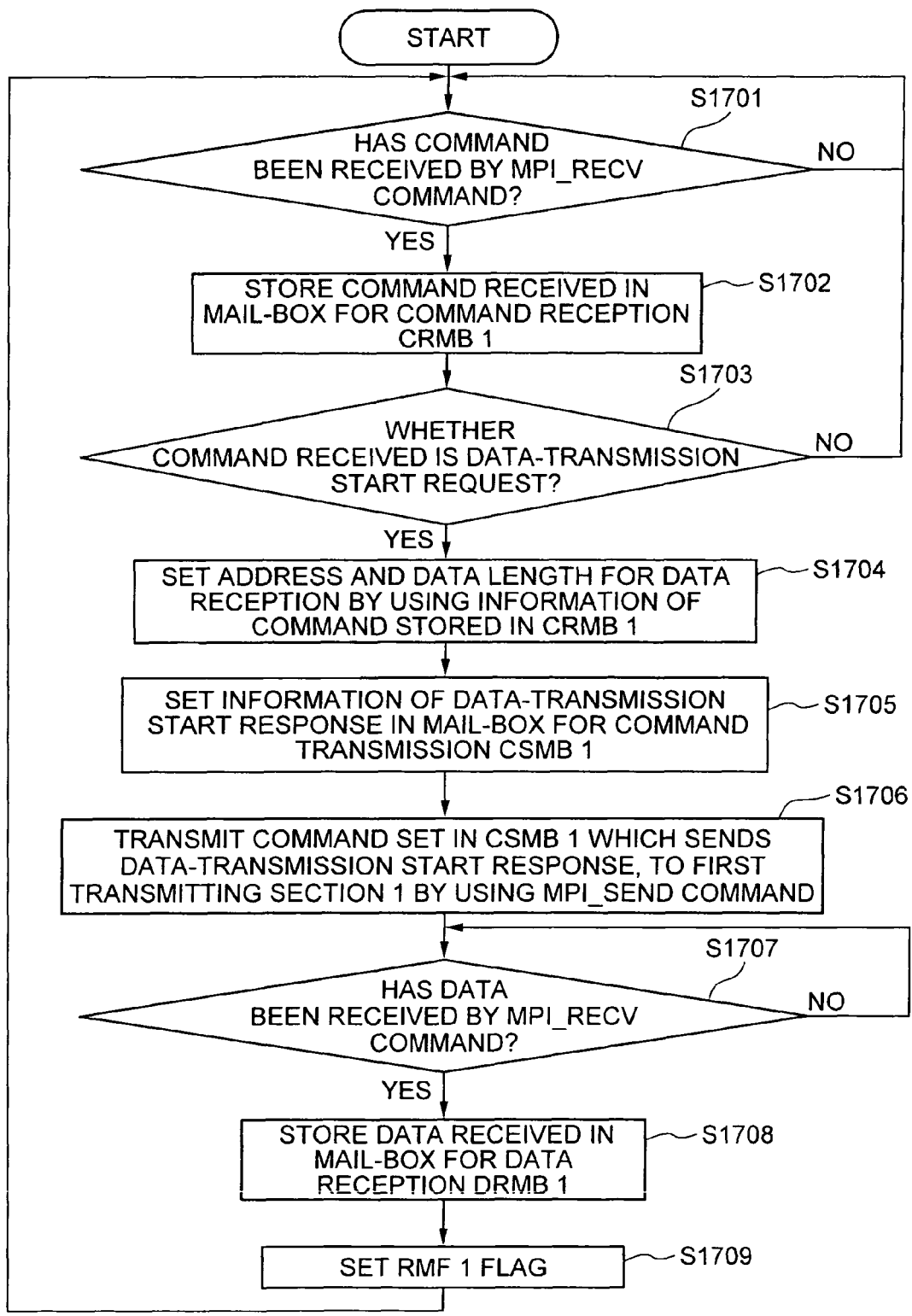
FIG. 17 is a flowchart showing a processing procedure of a second receiving section of the second embodiment.

FIG. 17 is a flowchart showing a processing procedure of the second receiving section 203. At step S1701, a judgment of whether or not the command has been received by the MPI_RECV command is made. When a judgment result at step S1701 is negative, step S1701 is repeated. When the judgment result is affirmative, at step S1702, the command received is stored in the mail-box for command reception CRMB 1.

At step S1703, a judgment of whether or not the command which has been received is a data-transmission start request is made. When a judgment result at step S1703 is negative, the process returns to step S1701. When the judgment result is affirmative, at step S1704, an address and a data length for data reception is set by using information of the command stored in the mail-box for command reception CRMB 1.

At step S1705, information of the data-transmission start response is set in the mail-box for command transmission CSMB 1. At step S1706, the second receiving section 203 outputs the data-transmission start response. For this, the command set in the mail-box for command transmission CSMB 1 is transmitted to the first transmitting section 103 by using the MPI_SEND command.

At step S1707, a judgment of whether or not the data has been received by the MPI_RECV command is made. When a judgment result at step S1707 is negative, step S1707 is repeated. When the judgment result is affirmative, at step S1708, the data which is received is stored in the mail-box for data reception DRMB 1. Step S1708 corresponds to a second data storing step. At step S1709, the RMF 1 flag of the mail-box for data reception is set. Next, the process returns to step S1701.

Figure 18:
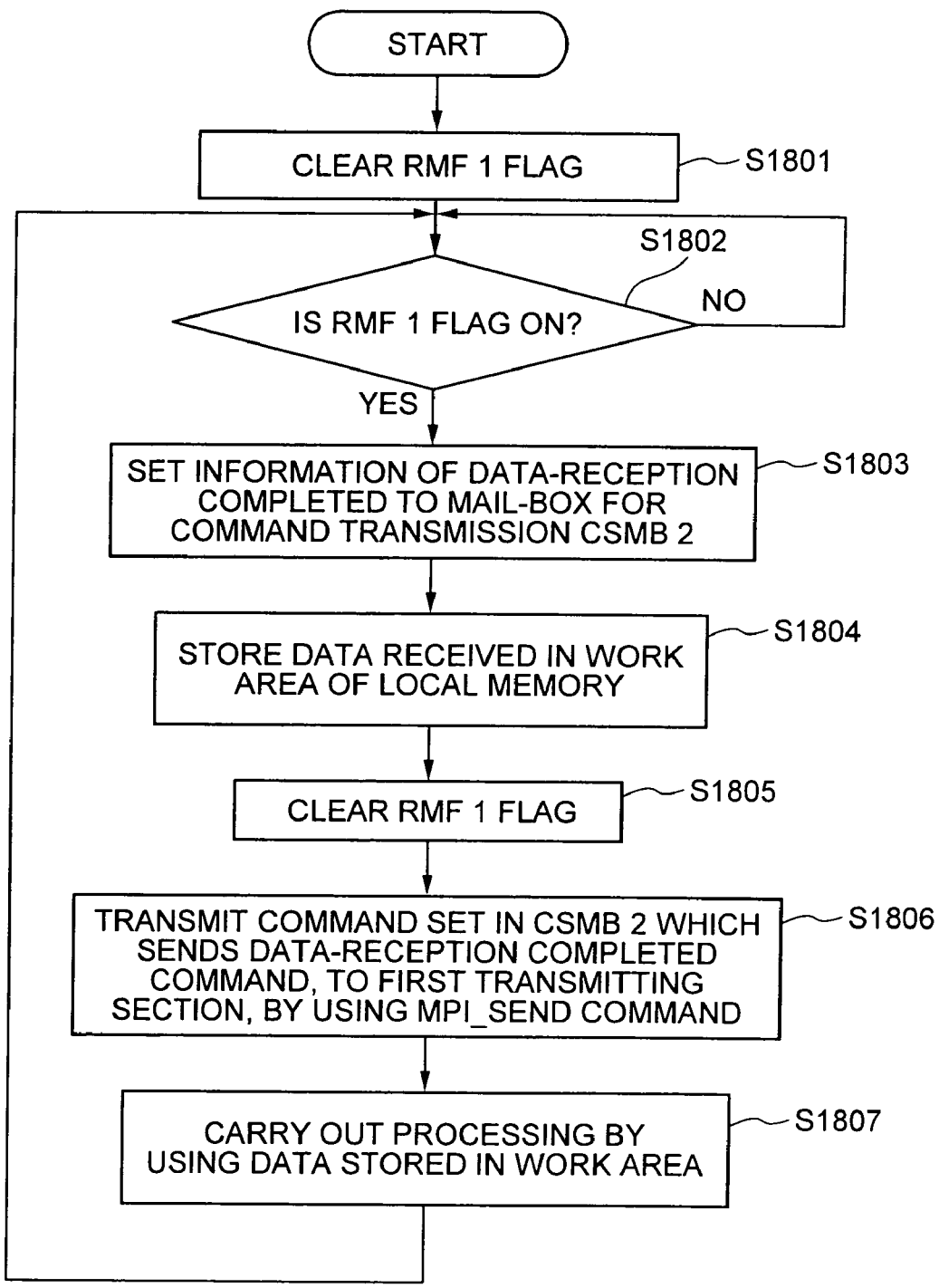
FIG. 18 is a flowchart showing a processing procedure of a second processing section of the second embodiment.

FIG. 18 is a flowchart showing a processing procedure of the second processing section 202. At step S1801, the RMF 1 flag of the mail-box for data reception is cleared. At step S1802, a judgment of whether or not the RMF 1 flag of the mail-box for data reception has been set is made. When a judgment result at step S1802 is negative, step S1802 is repeated. When the judgment result at step S1803 is affirmative, information of data-reception completion is set in the mail-box for command transmission CSMB 2.

At step S1804, the data which is received is stored in a work area of the local memory. At step S1805, the RMF 1 flag of the mail-box for data reception is cleared. At step S1806, the data-reception completion signal is output. For this, the second processing section 202 transmits the command set in the mail-box for command transmission CSMB 2, to the first transmitting section 103 by using the MPI_SEND command. At step S1807, the second processing section 202 performs arithmetic processing by using the data stored in the work area. Next, the process returns to step S1801.

Next, by using FIG. 19, a detailed sequence of the distributed processing of the second embodiment will be described. In sequence 1901, the SMF 1 flag and the STCN 1 flag are cleared. In sequence 1902, information of the data-transmission start request is set in the mail-box for command transmission CSMB 1.

In sequence 1903, when the SMF 1 flag is '1', turning of the SMF 1 flag to '0' is awaited. In sequence 1904, a result of processing of the data is stored in the mail-box for data transmission DSMB 1. In sequence 1905, when the transmission task count STCN 1 flag is '1', turning of STCN 1 flag to '0' is awaited. In sequence 1906, the STCN 1 flag is set. In sequence 1907, the SMF 1 flag is set. In sequence 1908, the first processing section 102 transmits the 'data-transmission start request'. For this, the first processing section 102 transmits the 'data-transmission start request' which is a command set in the mail-box for command transmission CSMB 1, to the second receiving section 203, by using the MPI_SEND (command transmission, CSMB 1) command.

In sequence 1909, the second receiving section 203 receives the 'data-transmission start request' by the MPI_RECV (command reception, CRMB 1). In sequence 1910, an address and a data length for data reception is set from information of the mail-box for the command reception. In sequence 1911, information of data-transmission start response is set in the mail-box for command transmission CSMB 1. In sequence 1912, the second receiving section 203 transmits the 'data-transmission start response' to the first transmitting section 103 by the MPI_SEND (command transmission, CSMB 1) command.

At step S1913, the first transmitting section 103 receives the 'data-transmission start response' by the MPI_RECV (command reception, CRMB 1) command. In sequence 1914, the first transmitting section 103 transmits the data stored in the mail-box for data transmission DSMB 1, to the second receiving section 203, by the MPI_SEND (data transmission, DSMB 1) command. In sequence 1915, the SMF 1 flag of the mail-box for data transmission is cleared.

In sequence 1916, the second receiving section 203 receives data by the MPI_RECV (data reception, DRMB 1) command. In sequence 1917, the second receiving section 203 sets the RMF 1 flag of the mail-box for data reception.

In sequence 1918, the second processing section 202 makes a judgment of whether the RMF 1 flag of the mail-box for data reception has been set, in other words, whether the data has been received. The RMF 1 flag of the mail-box for data reception has been cleared in advance in sequence 1900. At the time of receiving data, in sequence 1909, information of data-reception completion is set in the mail-box for command transmission CSMB 2. In sequence 1920, the data stored in the mail-box for data reception DRMB 1 is copied in the work area. In sequence 1921, the RMF 1 flag of the mail-box for data reception is cleared. In sequence 1922, the second processing section 202 transmits the 'data-reception completion' by the MPI_SEND (command transmission, CSMB 2) command. Moreover, in sequence 1927, the second processing section 202 starts processing of the reception data (data received). Next, in sequence 1928, the second processing section 202 completes the processing of data.

In sequence 1923, the first transmitting section 103 receives the 'data-reception completion' by the MPI_RECV (command reception, CRMB 1) command. Further, in sequence 1924, the first transmitting section 103 clears the transmission task count STCN 1 flag.

At a point of time of sequence 1925, the transmission task count STCN 1 flag is '0'. The first processing section 102, when the transmission task count STCN 1 flag at the end of the data processing is '1', waits till the STCN 1 flag becomes '0'.

Figure 19:
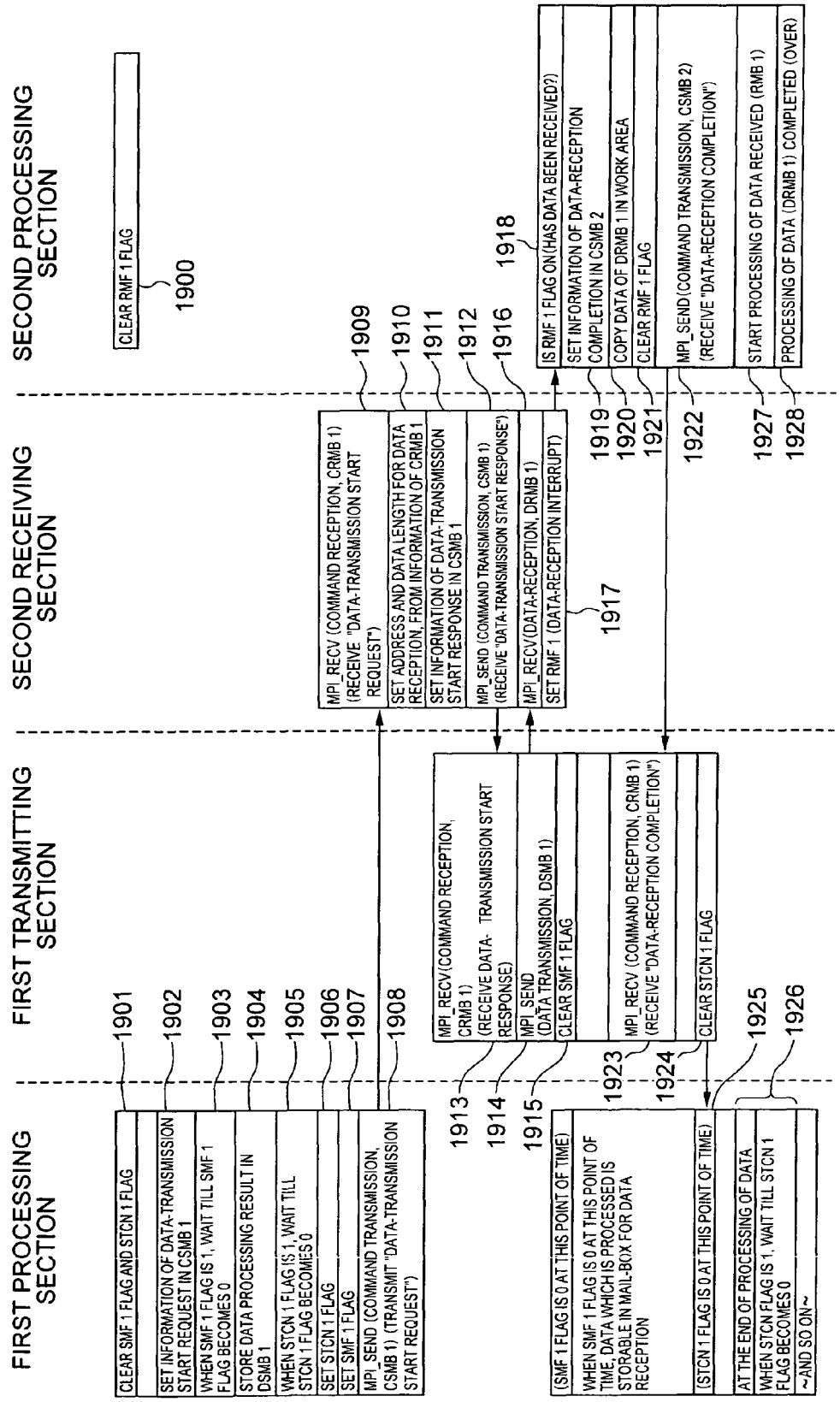
FIG. 19 is a diagram showing a sequences of a distributed processing system of the second embodiment.

As it is clear from FIG. 19, the first transmitting section 103 is in a state of having no effect on a processing capacity of the one processor element 100, after transmitting the data stored in the first memory section 101, till receiving the reception completion of the data. Moreover, the second receiving section 203 is in a state of not having an effect on a processing capacity of the other processing element 200, after transmitting the data-transmission start response, till receiving the data.

According to the second embodiment, at the time of transmitting data from one processing element 100 to the other processing element 200, it is possible to reduce substantially the interruption in processing which is due to communication. As a result, it is possible to operate the first processing section 102 and the second processing section 202 with a high efficiency.

Third Embodiment

Figure 20:
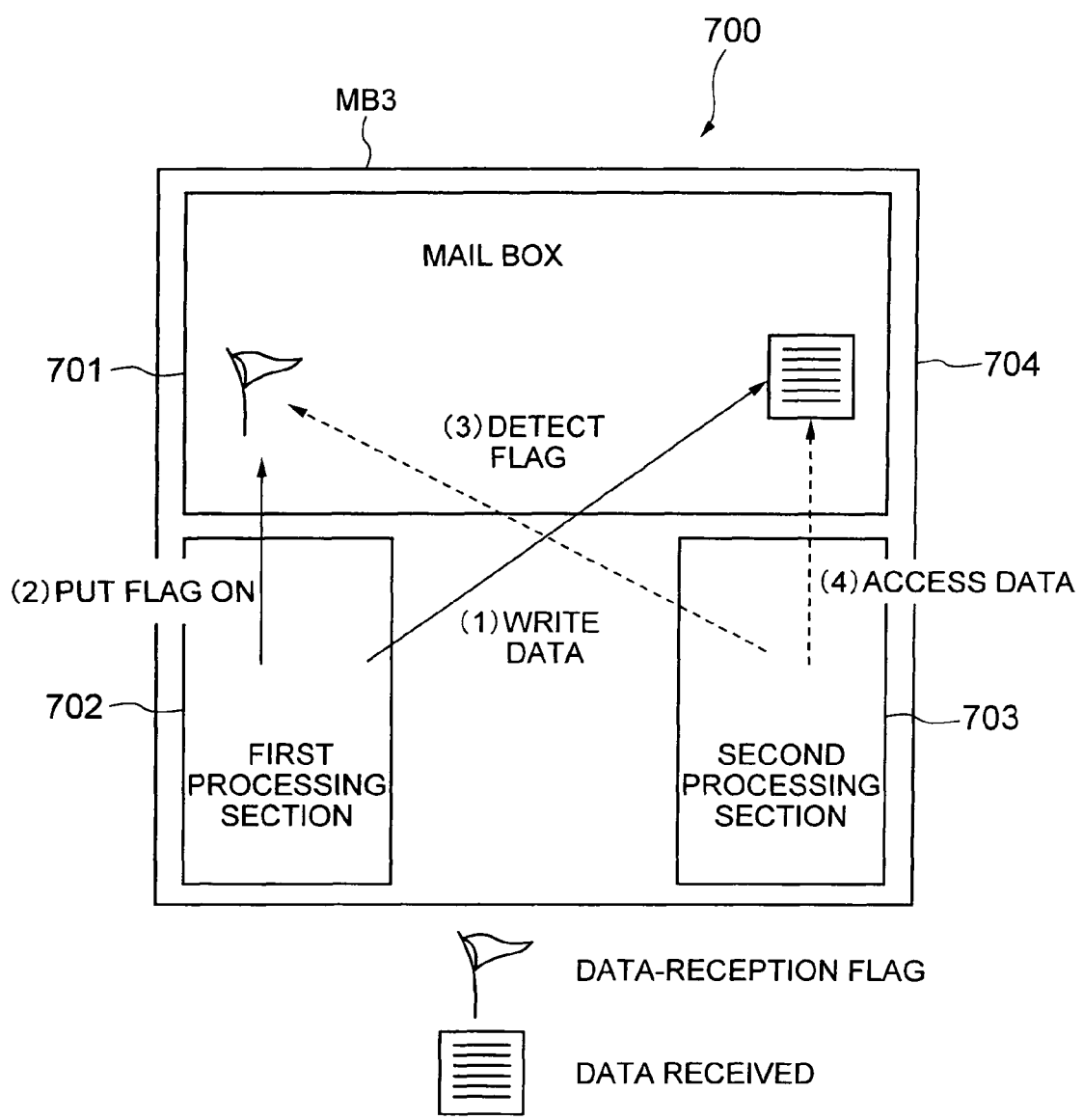
FIG. 20 is a diagram showing a schematic structure of a distributed processing system of a third embodiment.

Next, a distributed processing system 700 according to a third embodiment of the present invention will be described below. FIG. 20 shows a schematic structure of the distributed processing system 700. In the third embodiment, a first processing section 702 and a second processing section 703 are provided in a same substrate MB 3. Moreover, the first processing section 702 and the second processing section 703 have a mail-box 701 in common. In other words, the structure is such that the same memory section is used combinedly for a memory section of the first processing section 702 (processing element) and a memory section of the second processing section 703 (the other processing element).

A processing procedure of the third embodiment will be described below. Firstly, the first processing section 702 stores data in the mail-box 701. The first processing section 702 sets a flag in the mail-box 701. The second processing section 703 detects the flag which is set. Further, the second processing section 703 makes an access to the data which is stores in the mail-box 701. Here, it is assumed that the second processing section 703 knows an area in which the data is stored in the mail-box 701.

Accordingly, in the third embodiment, the communication becomes possible without transmitting and receiving an entity of data between the first processing section 702 and the second processing section 703. As a result, it is possible to execute efficiently a plurality of processes at a high speed.

As it has been described above, according to the present invention, it is possible to facilitate a speeding up (high speed) of processes in all the following cases.
(1) When a plurality of same (unique) processing sections are provided in the same substrate,
(2) When a plurality of processing sections having different functions are provided in the same substrate,
(3) When a plurality of same (unique) processing sections are provided in different substrates, and
(4) When a plurality of processing sections having different functions are provided in different substrates.

Moreover, without restricting to the MPI, it is also possible to control by using a so-called socket. In this manner, the present invention can have various modified embodiments which fairly fall within the basic teachings herein set forth.

INDUSTRIAL APPLICABILITY

As it has been described above, the distributed processing system according to the present invention is useful for a system which executes a plurality of processes at a high speed, and is particularly suitable for a system which performs communication of data between different substrates.

The invention claimed is:

1. A distributed processing method of connecting mutually at least two processing elements, wherein one of said processing elements includes a first processing section, a first memory section, and a first communication section having at least one of a first transmitting section and a first receiving section, wherein another of said processing elements includes a second processing section, a second memory section, and a second communication section having at least one of a second transmitting section and a second receiving section, and wherein the distributed processing method comprises:
a transmission step at which the first processing section, which has stored data in the first memory section, transmits a data-transmission start request to the second receiving section;
a transmission step at which the second receiving section, which has received the data-transmission start request, transmits a data-transmission start response to the first transmitting section;
a transmission step at which the first transmitting section, which has received the data-transmission start response, transmits the data stored in the first memory section to the second receiving section;
a storing step at which the second receiving section, which has received the data, stores the received data in the second memory section;
a notifying step at which the second receiving section, which has stored the data in the second memory section, notifies the reception of the data to the second processing section; and
a reading step at which the second processing section, which has received the reception notification of the data, reads the data stored in the second memory section.

2. The distributed processing method according to claim 1, wherein at least one of the first processing section and the second processing section stores data in a predetermined area of a respective one of the first memory section and the second memory section, or reads data which is stored in a predetermined area of the respective one of the first memory section and the second memory section.

3. The distributed processing method according to claim 1, wherein the first receiving section directly stores the data received from said another processing element, in a predetermined area of the first memory section, and
wherein the first transmitting section, which has received the data-transmission start response, transmits to said another processing element the data which is stored in the predetermined area of the first memory section.

4. The distributed processing method according to claim 1, wherein the at least two processing elements are provided on different substrates.

5. The distributed processing method according to claim 1, wherein the at least two processing elements are provided on the same substrate.

6. The distributed processing method according to claim 5, wherein the first memory section and the second memory section comprise a same memory section which is used in common by the at least two processing elements.

7. The distributed processing method according to claim 1, wherein the first processing section stores the data in a predetermined area of the first memory section; and
wherein the data received by the second receiving section is stored directly in a predetermined area of the second memory section.

8. The distributed processing method according to claim 1, further comprising:
a transmission step at which the second processing section, which has read the data, transmits a reception completion of the data, to the first transmitting section; and
a notifying step at which the first transmitting section, which has received the reception completion of the data, notifies the reception completion of the data to the first processing section.

9. The distributed processing method according to claim 1, wherein the first transmitting section is in a state of not having an effect on a processing capacity of said one processing element including the first processing section, after transmitting the data stored in the first memory section, until receiving the reception completion of the data, and
wherein the second receiving section is in a state of not having an effect on a processing capacity of said another processing element including the second processing section, after transmitting the data-transmission start response, until receiving the data.

10. The distributed processing method according to claim 1, wherein an MPI is used for a transmission and a reception of control information and the data, between the at least two processing elements.

11. A non-transitory computer-readable medium having stored thereon a program that is executable by a computer of a distributed processing system which comprises at least two processing elements which are mutually connected to each other, wherein one of said processing elements includes a first processing section, a first memory section, and a first communication section having at least one of a first transmitting section and a first receiving section, wherein another of said processing elements includes a second processing section, a second memory section, and a second communication section having at least one of a second transmitting section and a second receiving section, and wherein the program controls the computer of the distributed processing system to perform functions comprising:
- a transmission step at which the first processing section, which has stored data in the first memory section, transmits a data-transmission start request to the second receiving section;
- a transmission step at which the second receiving section, which has received the data-transmission start request, transmits a data-transmission start response to the first transmitting section;
- a transmission step at which the first transmitting section, which has received the data-transmission start response, transmits the data stored in the first memory section to the second receiving section;
- a storing step at which the second receiving section, which has received the data, stores the received data in the second memory section;
- a notifying step at which the second receiving section, which has stored the data in the second memory section, notifies the reception of the data to the second processing section; and
- a reading step at which the second processing section, which has received the reception notification of the data, reads the data stored in the second memory section.

12. The computer-readable medium according to claim 11, wherein at least one of the first processing section and the second processing section stores data in a predetermined area of a respective one of the first memory section and the second memory section, or reads data which is stored in a predetermined area of the respective one of the first memory section and the second memory section.

13. The computer-readable medium according to claim 11, wherein the first processing section stores the data in a predetermined area of the first memory section, and wherein the data received by the second receiving section is stored directly in a predetermined area of the second memory section.

14. The computer-readable medium according to claim 11, further comprising:
- a transmission step at which the second processing section, which has read the data, transmits a reception completion of the data, to the first transmitting section; and
- a notifying step at which the first transmitting section, which has received the reception completion of the data, notifies the reception completion of the data to the first processing section.

15. A distributed processing system which comprises at least two processing elements which are mutually connected to each other, wherein one of said processing elements includes a first processing section, a first memory section, and a first communication section having at least one of a first transmitting section and a first receiving section, wherein another of said processing elements includes a second processing section, a second memory section, and a second communication section having a second transmitting section and a second receiving section, and
wherein:
- the first processing section, which has stored data in the first memory section, transmits a data-transmission start request to the second receiving section;
- the second receiving section, which has received the data-transmission start request, transmits a data-transmission start response to the first transmitting section;
- the first transmitting section, which has received the data-transmission start response, transmits the data stored in the first memory section to the second receiving section;
- the second receiving section, which has received the data, stores the received data in the second memory section;
- the second receiving section, which has stored the data in the second memory section, notifies the reception of the data to the second processing section; and
- the second processing section, which has received the reception notification of the data, reads the data stored in the second memory section.

16. The distributed processing system according to claim 15, wherein at least one of the first processing section and the second processing section stores data in a predetermined area of a respective one of the first memory section and the second memory section, or reads data which is stored in a predetermined area of the respective one of the first memory section and the second memory section.

17. The distributed processing system according to claim 15, wherein the first processing section stores the data in a predetermined area of the first memory section, and wherein the data received by the second receiving section is stored directly in a predetermined area of the second memory section.

18. The distributed processing system according to claim 15, wherein:
- the second processing section, which has read the data, transmits a reception completion of the data, to the first transmitting section; and
- the first transmitting section, which has received the reception completion of the data, notifies the reception completion of the data to the first processing section.

* * * * *